US008640249B2

(12) United States Patent
Park

(10) Patent No.: US 8,640,249 B2
(45) Date of Patent: Jan. 28, 2014

(54) DIGITAL BROADCASTING CONDITIONAL ACCESS SYSTEM AND METHOD

(75) Inventor: Young-Sik Park, Daegu (KR)

(73) Assignee: Samsung Electronics Co., Ltd (KR)

( * ) Notice: Subject to any disclaimer, the term of this patent is extended or adjusted under 35 U.S.C. 154(b) by 1558 days.

(21) Appl. No.: 11/580,793

(22) Filed: Oct. 13, 2006

(65) Prior Publication Data

US 2007/0086589 A1 Apr. 19, 2007

(30) Foreign Application Priority Data

Oct. 13, 2005 (KR) .......................... 10-2005-0096610

(51) Int. Cl.
*H04L 29/06* (2006.01)
(52) U.S. Cl.
USPC ............... 726/26; 726/22; 713/168; 713/170; 713/173; 713/189; 380/201; 380/212; 380/239; 380/281
(58) Field of Classification Search
USPC ............... 726/26; 380/210, 211, 233; 725/31, 725/131, 151
See application file for complete search history.

(56) References Cited

U.S. PATENT DOCUMENTS

| 6,166,778 A * | 12/2000 | Yamamoto et al. ............ 348/569 |
| 6,510,515 B1 * | 1/2003 | Raith ............................. 713/163 |
| 6,587,561 B1 * | 7/2003 | Sered et al. .................... 380/241 |
| 2002/0080971 A1 * | 6/2002 | Fukami et al. ................. 380/277 |
| 2003/0005435 A1 * | 1/2003 | Nelger et al. .................... 725/31 |
| 2003/0070172 A1 * | 4/2003 | Matsuzaki et al. .............. 725/87 |
| 2003/0078061 A1 | 4/2003 | Kim |
| 2004/0086127 A1 * | 5/2004 | Candelore ...................... 380/281 |
| 2005/0099994 A1 * | 5/2005 | Kato et al. ...................... 370/352 |
| 2005/0240974 A1 * | 10/2005 | Hiramoto et al. ............. 725/100 |
| 2006/0123246 A1 * | 6/2006 | Vantalon et al. ............... 713/189 |
| 2006/0271950 A1 * | 11/2006 | Kim et al. ........................ 725/31 |
| 2006/0294547 A1 * | 12/2006 | Bon et al. ......................... 725/46 |
| 2007/0261076 A1 * | 11/2007 | Puputti ............................ 725/25 |

FOREIGN PATENT DOCUMENTS

| CN | 1764268 | 4/2006 |
| DE | 102 48 544 | 4/2004 |
| EP | 1 237 323 | 9/2002 |
| EP | 1 772 986 | 4/2007 |

(Continued)

OTHER PUBLICATIONS

ATSC Standard: Conditional Access System for Terrestrial Broadcast, Revision A with Amendment No. 1 (http://www.atsc.org/standards/a_70a_with_amend_1.pdf).*

*Primary Examiner* — Taghi Arani
*Assistant Examiner* — Jason Lee
(74) *Attorney, Agent, or Firm* — The Farrell Law Firm, P.C.

(57) ABSTRACT

Provided is a digital broadcasting conditional access system and method, including a digital broadcasting transmitter and a digital broadcasting receiver. The transmitter scrambles a broadcasting signal using a control key, generates broadcasting viewing restriction information and broadcasting viewing entitlement information, and transmits the scrambled broadcasting signal after incorporating the broadcasting viewing restriction information and broadcasting viewing entitlement information into the scrambled broadcasting signal. The receiver extracts the broadcasting viewing restriction information and the broadcasting viewing entitlement information included in the scrambled broadcasting signal to generate the control key, descrambles the broadcasting signal using the control key, and reproduces the descrambled broadcasting signal. Thus, the system and method can be provided for a digital broadcasting receiver including a smart card. Moreover, the digital broadcasting receiver can easily access to digital broadcasting using a Short Message Service (SMS) message and a smart card.

18 Claims, 7 Drawing Sheets

(56) References Cited

FOREIGN PATENT DOCUMENTS

| JP | 2005-191847 | 7/2005 |
| KR | 10-2002-0031626 | 5/2002 |
| WO | WO 2006/043766 | 4/2006 |

* cited by examiner

DIGITAL BROADCASTING CONDITIONAL ACCESS SYSTEM AND METHOD

PRIORITY

This application claims priority under 35 U.S.C. §119 to an application entitled "Digital Broadcasting Conditional Access System and Method" filed in the Korean Intellectual Property Office on Oct. 13, 2005 and assigned Serial No. 2005-96610, the contents of which are incorporated herein by reference.

BACKGROUND OF THE INVENTION

1. Field of the Invention

The present invention generally relates to a digital broadcasting system, and in particular, to a digital broadcasting conditional access system and method.

2. Description of the Related Art

A Conditional Access System (CAS) indicates a system for authorizing access to pay broadcasting services. A broadcasting station providing pay broadcasting services scrambles a broadcasting signal before transmission, and a receiver descrambles the received broadcasting signal, thereby allowing only an authorized subscriber to enjoy the pay broadcasting services provided.

When a broadcasting station provides free broadcasting, the CAS cannot be used. However, when such a broadcasting station requires billing for a particular reason (e.g., broadcasting subscription in shadow areas or subscription for contents requiring billing), an appropriate CAS should be implemented:

A mobile communication terminal equipped with a smart card has recently been developed and user data and other data are stored in a flash memory of the smart card. One of the representative uses of the smart card is to provide a roaming service of the mobile communication terminal with a mobile communication terminal user identity module embedded in the smart card. Examples of a mobile communication terminal user identity module include a Subscriber Identify Module (SIM) card of a Universal Mobile Telecommunication System (UMTS), a Universal Subscriber Identity Module (USIM) of a Global System for Mobile Communications (GSM) system, and a User Identity Module (UIM) card a Removal User Identity Module (RUIM) of a Code Division Multiple Access (CDMA) system and a Surface Mount Device (SMD). The smart card having the mobile communication terminal user identity module embedded therein is basically used to share data with the mobile communication terminal.

However, as a mobile communication terminal equipped with such a smart card becomes capable of receiving digital broadcasting and the demand for such an equipped mobile communication terminal increases, a digital broadcasting CAS for the mobile communication terminal is required.

SUMMARY OF THE INVENTION

It is, therefore, an object of the present invention to provide a digital broadcasting conditional access system and method for a digital broadcasting receiver equipped with a smart card.

It is another object of the present invention to provide a digital broadcasting conditional access system and method using a Short Messaging Service (SMS) and a smart card.

According to the present invention, there is provided a digital broadcasting conditional access system including a digital broadcasting transmitter and a digital broadcasting receiver. The digital broadcasting transmitter scrambles a broadcasting signal using a control key, generates broadcasting viewing restriction information and broadcasting viewing entitlement information, and transmits the scrambled broadcasting signal after incorporating the generated broadcasting viewing restriction information and broadcasting viewing entitlement information into the scrambled broadcasting signal. The digital broadcasting receiver extracts the broadcasting viewing restriction information and the broadcasting viewing entitlement information included in the scrambled broadcasting signal to generate the control key, descrambles the broadcasting signal using the control key, and reproduces the descrambled broadcasting signal.

According to the present invention, there is provided a digital broadcasting transmitter including a control key generator, a scrambler, a broadcasting viewing restriction information generator, a broadcasting viewing entitlement information generator and a multiplexer. The control key generator generates and outputs a control key. The scrambler scrambles a broadcasting signal using the control key. The broadcasting viewing restriction information generator generates broadcasting viewing restriction information including the control key and broadcasting channel-based viewing entitlement information. The broadcasting viewing entitlement information generator generates broadcasting viewing entitlement information including a second key for decrypting the broadcasting viewing restriction information and subscriber-based broadcasting viewing entitlement information. The multiplexer incorporates the generated broadcasting viewing restriction information and broadcasting viewing entitlement information into the broadcasting signal scrambled by the scrambler.

According to the present invention, there is provided a broadcasting signal transmission method of a digital broadcasting transmitter. The broadcasting signal transmission method includes scrambling a broadcasting signal using a control key for scrambling the broadcasting signal, generating broadcasting viewing restriction information and broadcasting viewing entitlement information for the broadcasting signal, and transmitting the generated broadcasting viewing restriction information and broadcasting viewing entitlement information after incorporating the broadcasting viewing restriction information and broadcasting viewing entitlement information into the scrambled broadcasting signal.

According to the present invention, there is provided a digital broadcasting receiver including a digital broadcasting receiving unit, a filter, a control key generator and a descrambler. The digital broadcasting receiving unit receives a scrambled broadcasting signal. The filter extracts broadcasting viewing restriction information and broadcasting viewing entitlement information from the received broadcasting signal. The control key generator generates a control key using the extracted broadcasting viewing restriction information and broadcasting viewing entitlement information. The descrambler descrambles the scrambled broadcasting signal using the generated control key.

Preferably, the digital broadcasting receiver further includes a Radio-Frequency (RF) transceiver for transmitting a digital broadcasting subscription request to a separate server upon request from a user and receiving a first key for decrypting the broadcasting viewing entitlement information from the server responding to the digital broadcasting subscription request.

According to the present invention, there is provided a digital broadcasting conditional access method of a digital broadcasting receiver. The digital broadcasting conditional access method includes extracting broadcasting viewing restriction information and broadcasting viewing entitlement information included in a received broadcasting signal scrambled in a digital bioacfcasting reception mode, generating a control key for descrambling the scrambled broadcasting signal using the extracted broadcasting viewing restriction information and broadcasting viewing entitlement information, and descrambling the scrambled broadcasting signal using the generated control key.

Preferably, the digital broadcasting conditional access method further includes transmitting a digital broadcasting subscription request to a separate server upon request from a user and receiving a first key for decrypting the broadcasting viewing entitlement information from the server responding to the digital broadcasting subscription request and storing the first key.

BRIEF DESCRIPTION OF THE DRAWINGS

The above and other objects, features, and advantages of preferred embodiments of the present invention will be more apparent from the following description taken in conjunction with the accompanying drawings, in which.

DETAILED DESCRIPTION OF THE PREFERRED EMBODIMENTS

The matters defined in the description such as a detailed construction and elements are provided to assist in a comprehensive understanding of preferred embodiments of the invention. Accordingly, those of ordinary skill in the art will recognize that various changes and modifications of the embodiments described herein can be made without departing from the scope and spirit of the invention. Also, descriptions of well-known functions and constructions are omitted for the sake of clarity and conciseness.

Figure 1:
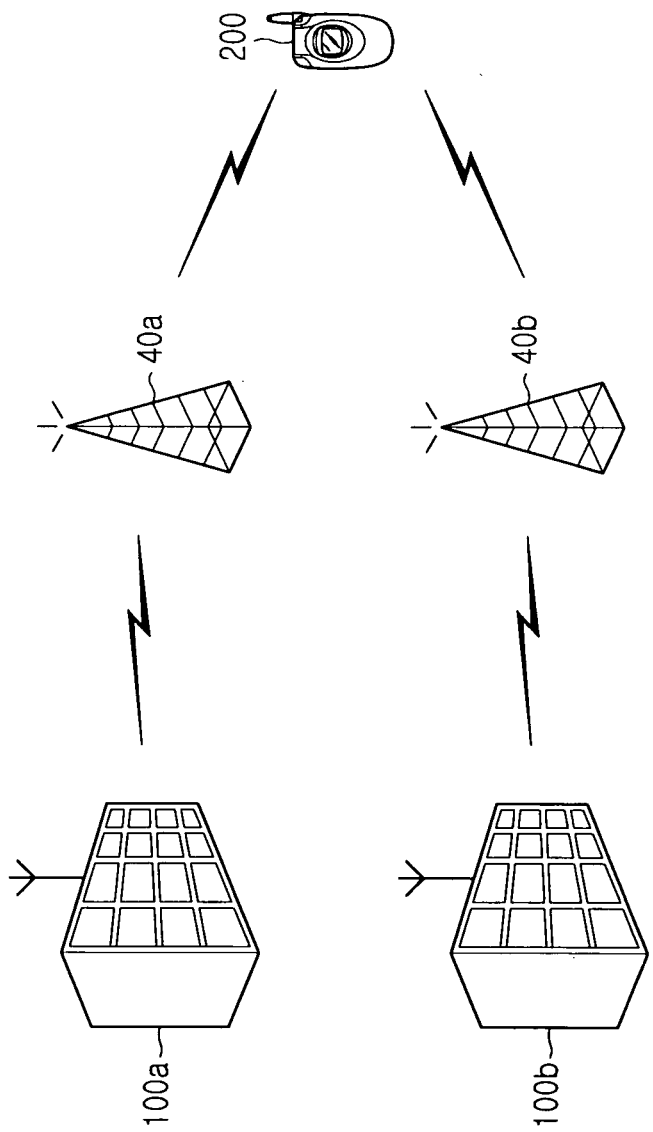
FIG. 1 illustrates a digital broadcasting conditional access system according to the present invention.

FIG. 1 illustrates a digital broadcasting conditional access system according to the present invention.

Referring to FIG. 1, the digital broadcasting conditional access system includes a digital broadcasting transmitter 100a or 100b (e.g., a broadcasting station) for configuring multimedia data as digital broadcasting data to provide a digital broadcasting service and a digital broadcasting receiver 200 for receiving the digital broadcasting data to output the multimedia data.

A repeater 40a or 40b transmits a digital broadcasting signal transmitted from the digital broadcasting transmitter 100a or 100b to the digital broadcasting receiver 200.

In particular, the digital broadcasting transmitter 100a or 100b scrambles a broadcasting signal using a control key and generates broadcasting viewing restriction information and broadcasting viewing entitlement information for the broadcasting signal. The digital broadcasting transmitter 100a or 100b incorporates the generated broadcasting restriction information and broadcasting viewing entitlement information into the scrambled broadcasting signal and transmits the scrambled broadcasting signal to the digital broadcasting receiver 200.

The digital broadcasting receiver 200 extracts the broadcasting viewing restriction information and broadcasting viewing entitlement information included in the scrambled broadcasting signal to generate the control key and descrambles the scrambled broadcasting signal using the generated control key, thereby reproducing the broadcasting signal. The control key indicates a Control Word (CW) for scrambling or descrambling the broadcasting signal.

In the present invention, the broadcasting viewing restriction information indicates an Entitlement Control Message (ECM) including broadcasting channel-based reception entitlement information and the control key. The broadcasting channel-based reception entitlement information indicates reception entitlement for programs broadcast in each broadcasting channel and may be, for example, reception entitlement for a broadcasting program broadcast in a specific pay channel.

The broadcasting viewing entitlement information indicates an Entitlement Management Message (EMM) including a second key for decrypting the broadcasting viewing restriction information and subscriber-based broadcasting viewing entitlement information. The subscriber-based broadcasting viewing entitlement information indicates viewing entitlement for digital broadcasting.

The digital broadcasting transmitter 100a or 100b may generate the broadcasting viewing entitlement information by incorporating a first key for decrypting the broadcasting viewing entitlement information into the broadcasting viewing entitlement information at predetermined intervals. The first key is used to update a first key of the digital broadcasting receiver 200, because the first key of the digital broadcasting receiver 200 is used for each period (e.g., on a daily, weekly or monthly basis).

The digital broadcasting receiver 200 includes a database storing the broadcasting channel-based reception entitlement information, the subscriber-based broadcasting viewing entitlement information, the first key and the second key.

The digital broadcasting conditional access system may further include a subscriber management server for managing digital broadcasting subscriber information and may be implemented with, for example, an Over-The-Air (OTA) activation server.

The subscriber management server transmits the first key for decrypting the broadcasting viewing entitlement information to digital broadcasting receivers requesting subscription for digital broadcasting. At this time, the subscriber management server transmits the first key after incorporating the first key into a data region of an OTA message. The structure of the OTA message is well known and therefore, a description thereof will not be given.

The digital broadcasting receiver 200 may transmit a digital broadcasting subscription request to the subscriber management server using an SMS message or the wireless Internet and stores the first key received from the subscriber management server in a smart card (e.g. SIM card). In case the smart card is not included, the digital broadcasting receiver 200 may store the first key in a memory.

Upon reception of the scrambled broadcasting signal, the digital broadcasting receiver 200 extracts the second key and the subscriber-based broadcasting viewing entitlement information included in the broadcasting viewing entitlement information using the first key stored in the smart card and extracts the control key and the broadcasting channel-based reception entitlement information included in the broadcasting viewing restriction information using the extracted second key. When the first key is included in the broadcasting viewing entitlement information, the digital broadcasting receiver 200 updates the stored first key with the first key included in the broadcasting viewing entitlement information.

Figure 2:
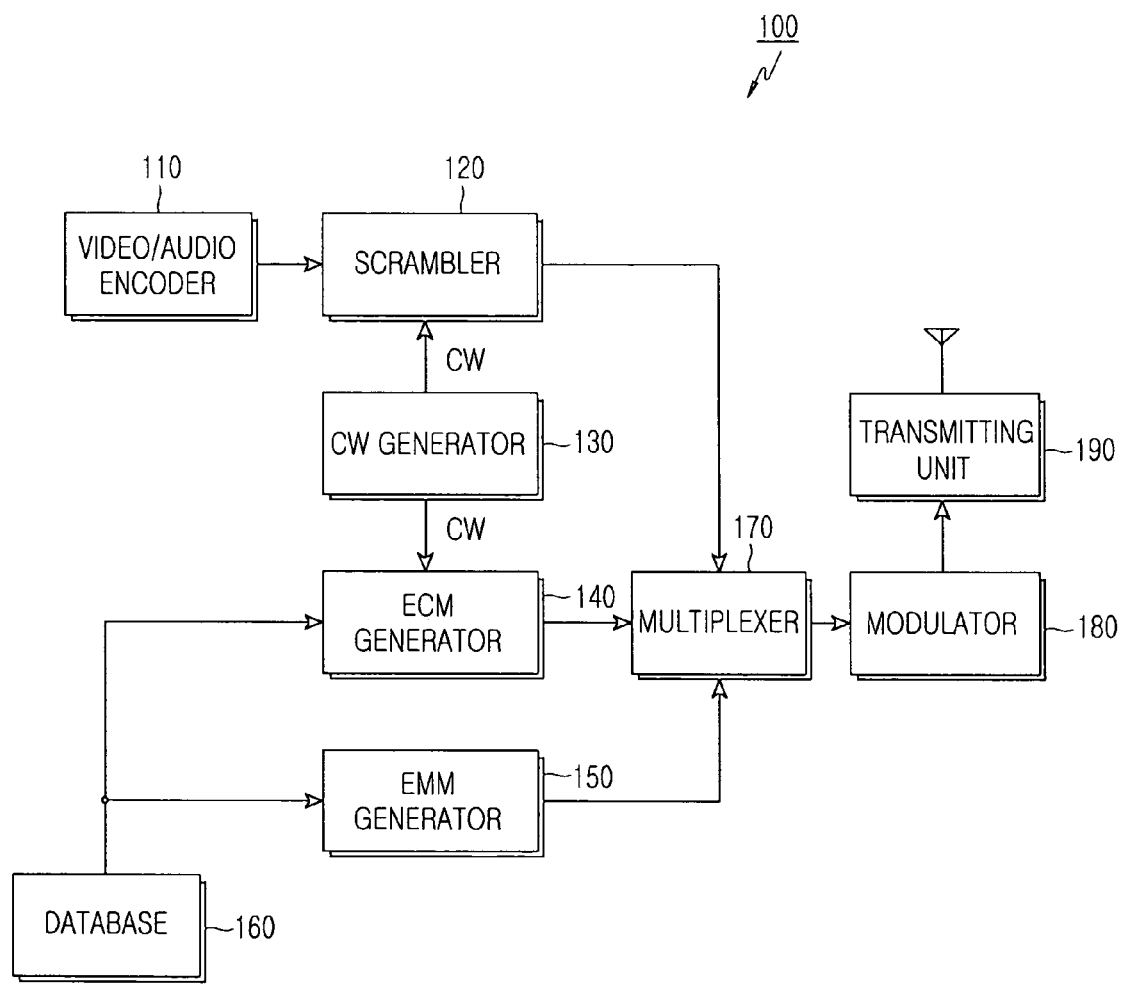
FIG. 2 is a block diagram of a digital broadcasting transmitter according to the present invention.

FIG. 2 is a block diagram of the digital broadcasting transmitter 100 according to the present invention.

Referring to FIG. 2, the digital broadcasting transmitter 100 includes a video/audio encoder 110, a scrambler 120, a CW generator 130, an ECM generator, an EMM generator 150, a database 160, a multiplexer 170, a modulator 180, and a transmitter 190. Although not shown in FIG. 2, the digital broadcasting transmitter 100 is assumed to include a controller for controlling overall operations of the digital broadcasting receiver 200.

The video/audio encoder 110 encodes an input broadcasting signal including video and audio signals.

The scrambler 120 scrambles the encoded broadcasting signal using a control key and outputs the scrambled broadcasting signal to the multiplexer 170.

The CW generator 130 generates a control key for scrambling or descrambling the encoded broadcasting signal, i.e., a CW, and outputs the generated control key to the scrambler 120 and the ECM generator 140. The CW generator 130 may generate the control key using information about subscribers requesting subscription for digital broadcasting.

The ECM generator 140 generates broadcasting viewing restriction information (i.e., an ECM) including the control key output from the CW generator 130 and broadcasting channel-based reception entitlement information stored in the database 160 and outputs the generated broadcasting viewing restriction information to the multiplexer 170.

The EMM generator 150 reads a second key for decrypting the broadcasting viewing restriction information and subscriber-based broadcasting viewing entitlement information from the database 160 to generate broadcasting viewing entitlement information (i.e., an EMM) including the second key and the subscriber-based broadcasting viewing entitlement information and outputs the generated broadcasting viewing entitlement information to the multiplexer 170. The EMM generator 150 may read a first key for decrypting the broadcasting viewing entitlement information from the database 160 and incorporate the read first key into the broadcasting viewing entitlement information at predetermined intervals.

The database 160 stores the broadcasting channel-based reception entitlement information, the subscriber-based broadcasting viewing entitlement information, the first key for decrypting the broadcasting viewing entitlement information and the second key for decrypting the broadcasting viewing restriction information.

The multiplexer 170 outputs the broadcasting signal scrambled by the scrambler 120 to the modulator 180 after incorporating the generated broadcasting viewing restriction information and broadcasting viewing entitlement information into the scrambled broadcasting signal, and the broadcasting signal modulated by the modulator 180 is transmitted through the transmitter 190.

Figure 3:
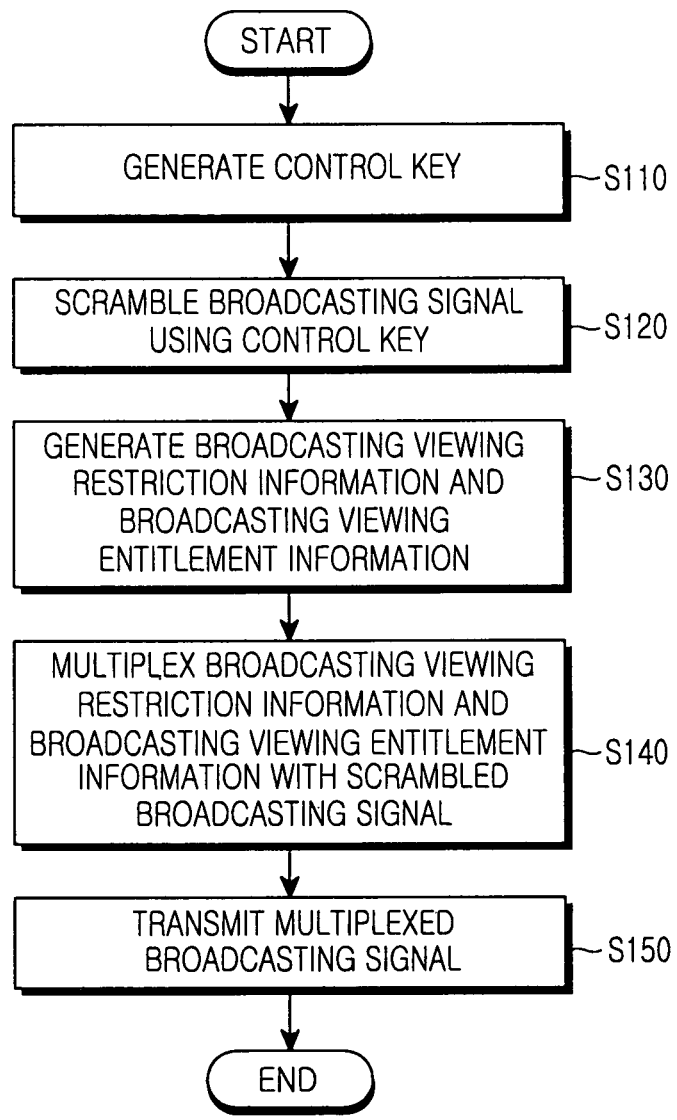
FIG. 3 is a flowchart illustrating an operation of a digital broadcasting transmitter according to the present invention.

FIG. 3 is a flowchart illustrating an operation of the digital broadcasting transmitter 100 according to the present invention.

Referring to FIGS. 1 through 3, the digital broadcasting transmitter 100 generates a control key for scrambling an encoded broadcasting signal in step S110.

The digital broadcasting transmitter 100 scrambles the encoded broadcasting signal using the generated control key in step S120.

The digital broadcasting transmitter 100 generates broadcasting viewing restriction information and broadcasting viewing entitlement information for the broadcasting signal in step S130. At this time, the digital broadcasting receiver 200 may generate the broadcasting viewing entitlement information after incorporating a new first key into the broadcasting viewing entitlement information at predetermined intervals to update a first key of the digital broadcasting receiver 200.

The digital broadcasting transmitter 100 multiplexes the generated broadcasting viewing restriction information and broadcasting viewing entitlement information with the scrambled broadcasting signal in step S140. Hence, the broadcasting viewing restriction information and the broadcasting viewing entitlement information are included in the broadcasting signal.

When terrestrial digital broadcasting is employed, a digital broadcasting frame includes a Main Service Channel (MSC) including broadcasting data and a Fast Information Channel (FIC) indicating information of the MSC and the MSC includes multiple sub-channels (e.g., 0-63 sub-channels) including video, audio and data channels.

Thus, the digital broadcasting transmitter 100 may incorporate the broadcasting viewing restriction information and the broadcasting viewing entitlement information into the FIC or into one of the 64 sub-channels (e.g., a $64^{th}$ sub-channel) when multiplexing the broadcasting viewing restriction information and the broadcasting viewing entitlement information with the scrambled broadcasting signal.

The digital broadcasting transmitter 100 transmits the multiplexed broadcasting signal in step S150.

Figure 4:
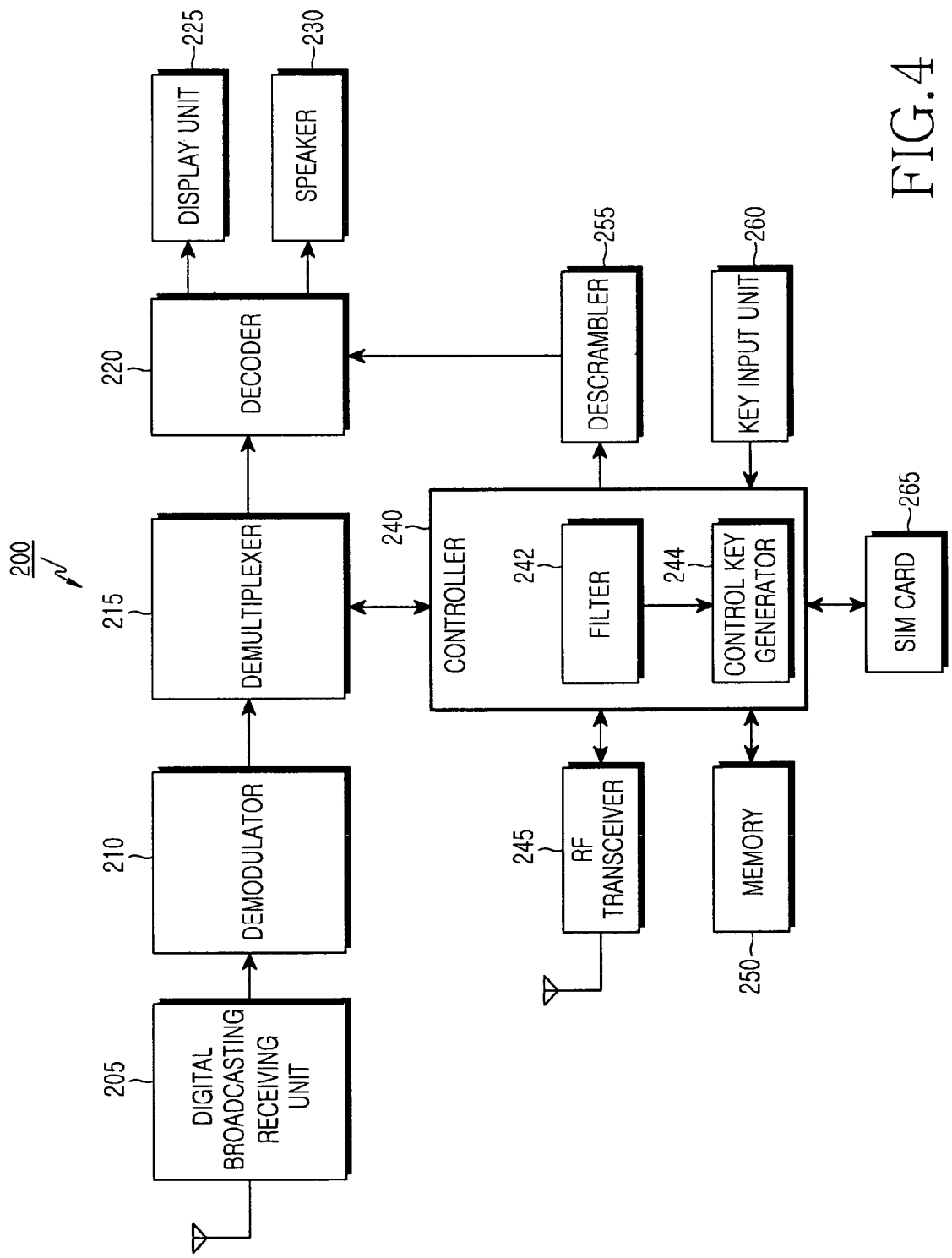
FIG. 4 is a block diagram of a digital broadcasting receiver according to a first embodiment of the present invention.

FIG. 4 is a block diagram of the digital broadcasting receiver 200 according to a first embodiment of the present invention.

The digital broadcasting receiver 200 includes a digital broadcasting receiving unit 205, a demodulator 210, a demultiplexer 215, a decoder 220, a display unit 225, a speaker 230, a controller 240, a Radio-Frequency (RF) transceiver 245, a memory 250, a descrambler 255, a key input unit 260 and a smart card unit 265.

The digital broadcasting receiving unit 205 receives a scrambled broadcasting signal and outputs the scrambled broadcasting signal to the demodulator 210 under the control of the controller 240.

The demodulator 210 demodulates the scrambled broadcasting signal received by the digital broadcasting receiving unit 205 into a digital broadcasting transport stream and outputs the digital broadcasting transport stream to the demultiplexer 215. The demultiplexer 215 may be included in the controller 240.

The demultiplexer 215 demultiplexes the broadcasting signal demodulated into the digital broadcasting transport stream to divide the digital broadcasting transport stream into an audio data stream and a video data stream. The audio data stream and the video data stream are decoded into an analog audio signal and an analog video signal by the decoder 220 and then output through an output unit, which indicates the display unit 225 and the speaker 230.

The demultiplexer 215 extracts broadcasting viewing entitlement information and broadcasting viewing restriction information from the broadcasting signal and outputs the extracted information to the controller 240. At this time, as described with reference to FIG. 1, the demultiplexer 215 searches sub-channels of the broadcasting signal to extract broadcasting viewing entitlement information and broadcasting viewing restriction information if they are included in a predetermined sub-channel.

The amount of broadcasting viewing entitlement information and broadcasting viewing restriction information included in the broadcasting signal varies with the number of digital broadcasting subscribers. Thus, it is obvious that broadcasting viewing entitlement information and broadcasting viewing restriction information included in the broadcasting signal varies with subscribers.

The controller 240 (e.g., an MSM) controls overall operations of the digital broadcasting receiver 200. If a user requests subscription for digital broadcasting, the controller 240 controls the RF transceiver 245 to transmit the digital broadcasting subscription request to a separate server (e.g., the subscriber management server) and to receive a first key for decrypting the broadcasting viewing entitlement information from the requested server. The digital broadcasting subscription request may use an SMS message or the wireless Internet. The received first key is stored in the smart card 265 or may be stored in the memory 250.

The controller 240 includes a filter 242 and a control key generator 244.

The filter 242 extracts only broadcasting viewing restriction information and broadcasting viewing entitlement information corresponding to subscriber information of the digital broadcasting receiver 200 and transmits the same to the control key generator 244. In other words, the filter 242 extracts broadcasting viewing restriction information and broadcasting viewing entitlement information according to the subscriber information of the digital broadcasting receiver 200.

The broadcasting viewing restriction information and broadcasting viewing entitlement information according to the subscriber information of the digital broadcasting receiver 200 are received at predetermined intervals. In other words, the broadcasting viewing restriction information is received at intervals of a first time (e.g., five seconds) as being included in the broadcasting signal and the broadcasting viewing entitlement information is received at intervals of a second time (e.g., thirty seconds) longer than the first time as being included in the broadcasting signal. Thus, it is preferable that the filter 242 simultaneously transmits the broadcasting viewing restriction information received at intervals of the first time and the broadcasting viewing entitlement information received at intervals of the second time to the control key generator 244 to reduce power consumption of the digital broadcasting receiver 200. To this end, the filter 244 may include a separate buffer that may be included in the controller 240.

The control key generator 244 generates a control key using the extracted broadcasting viewing restriction information and broadcasting viewing entitlement information. In other words, the control key generator 244 decrypts the broadcasting viewing entitlement information using the first key stored in the smart card 265 or the memory 250 and extracts a second key and subscriber-based broadcasting viewing entitlement information included in the broadcasting viewing entitlement information. The control key generator 244 decrypts the broadcasting viewing restriction information using the extracted second key and extracts the control key and broadcasting channel-based reception entitlement information included in the broadcasting viewing restriction information.

The control key generator 244 compares the extracted subscriber-based broadcasting viewing entitlement information with broadcasting channel-based reception entitlement information. If the extracted subscriber-based broadcasting viewing entitlement information and broadcasting channel-based reception entitlement information coincide with each other (i.e., if a corresponding subscriber is an authorized subscriber), the control key generator 244 transmits the control key to the descrambler 255 under the control of the controller 240.

When the first key is included in the broadcasting viewing entitlement information, the control key generator 244 transmits the first key to the smart card 265 or the memory 250 under the control of the controller 240 to update a previously stored first key. Updating the first key indicates renewing digital broadcasting subscription for security.

Accordingly, even when the digital broadcasting subscription period of a user of the digital broadcasting receiver 200 is one month, a first key received from the subscriber management server at the time of digital broadcasting subscription is not used for one month, but is updated at predetermined intervals (e.g., weekly) through received broadcasting viewing entitlement information included in a broadcasting signal, thereby improving security.

It is preferable that a first key initially stored in the smart card 265 be used, e.g., for a week, and then updated on a weekly basis through received broadcasting viewing entitlement information included in a broadcasting signal.

The memory 250 stores various information required for control of the digital broadcasting receiver 200. The memory 250 may store the first key received from a server responding to a user's request for digital broadcasting subscription under the control of the controller 240.

The descrambler 255 descrambles the scrambled broadcasting signal using the control key generated by the control key generator 244. The descrambled broadcasting signal is decoded by the decoder 220 and is output to an output unit.

The key input unit 260 may include character keys, number keys and function keys and outputs a key input signal corresponding to a key input by the user to the controller 240. Thus, the user may request digital broadcasting subscription or cancellation thereof for receiving the broadcasting viewing entitlement information through the key input unit 260.

The smart card 265 stores the first key received through the RF transceiver 245 (i.e., a key for decrypting the broadcasting viewing entitlement information) through a smart interface unit (not shown) providing, an interface with the digital broadcasting receiver 200. The smart card 265 is removable from the digital broadcasting receiver 200.

Figure 5:
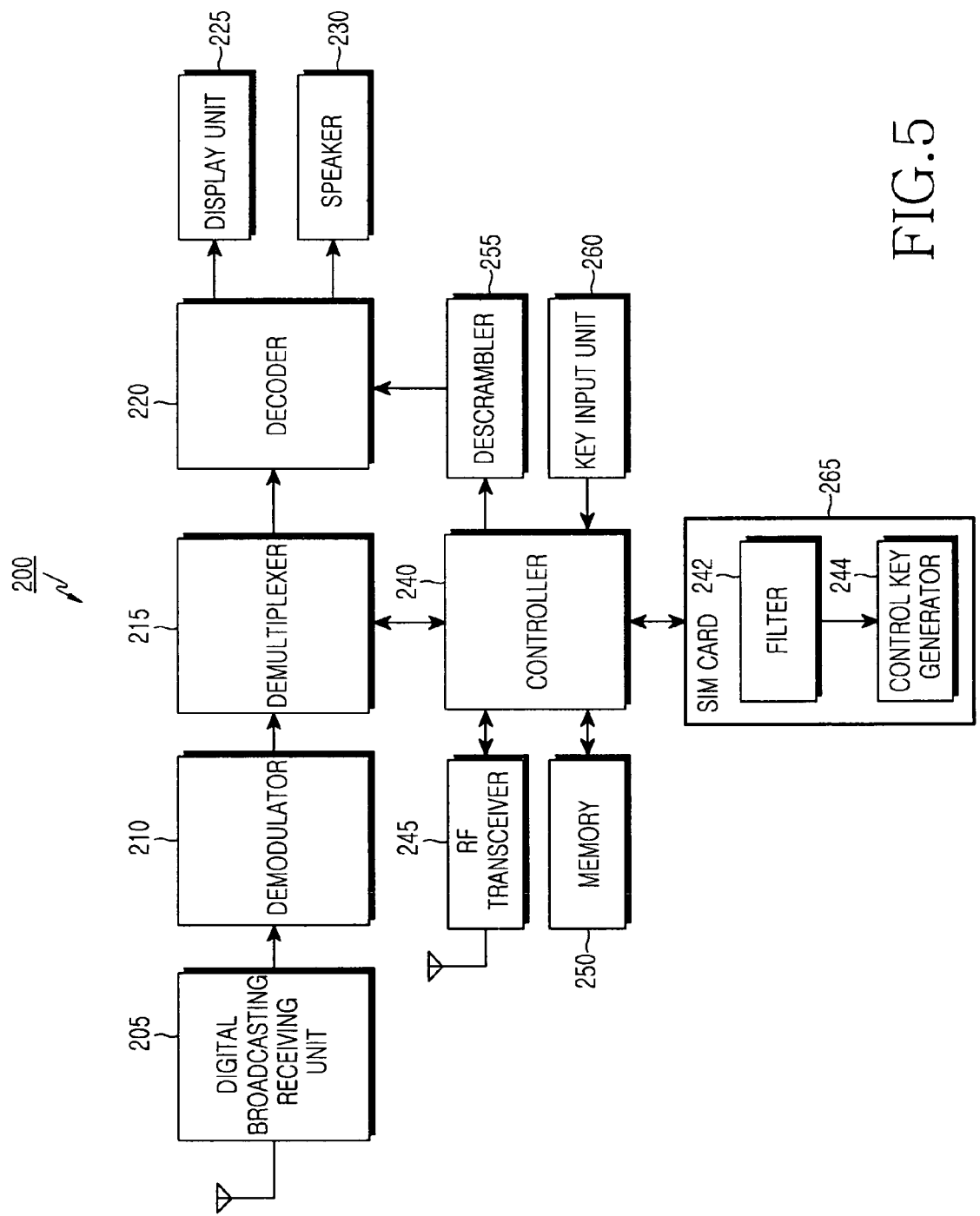
FIG. 5 is a block diagram of a digital broadcasting receiver according to a second embodiment of the present invention.

The smart card 265 may include the filter 242 and the control key generator 244 as illustrated in FIG. 5, which is a block diagram of the digital broadcasting receiver 200 according to a second embodiment of the present invention.

The smart card 265 may vary with the communication system it is used with. For example, the smart card 265 may be USIM card for a UMTS or a UIM card or a RUIM card for a CDMA system. The smart card unit 170 may also be a Surface Mount Device (SMD) implemented as a separate hardware chip.

When the smart card 265 is a pre-paid SIM card including a first key that is available only for a predetermined period, the digital broadcasting receiver 200 may allow a user to use only limited contents (e.g., contents of limited genres or categories) using the pre-paid SIM card.

Although the controller 240 or the smart card 265 includes the filter 242 and the control key generator 244 in the foregoing embodiments of the present invention, the filter 242 and the control key generator 244 may be included in the demultiplexer 215. Moreover, the descrambler 255 may also be included, together with the filter 242 and the control key generator 244.

In addition, the present invention is applicable when the demultiplexer 214 is included in the controller 240.

Figure 6:
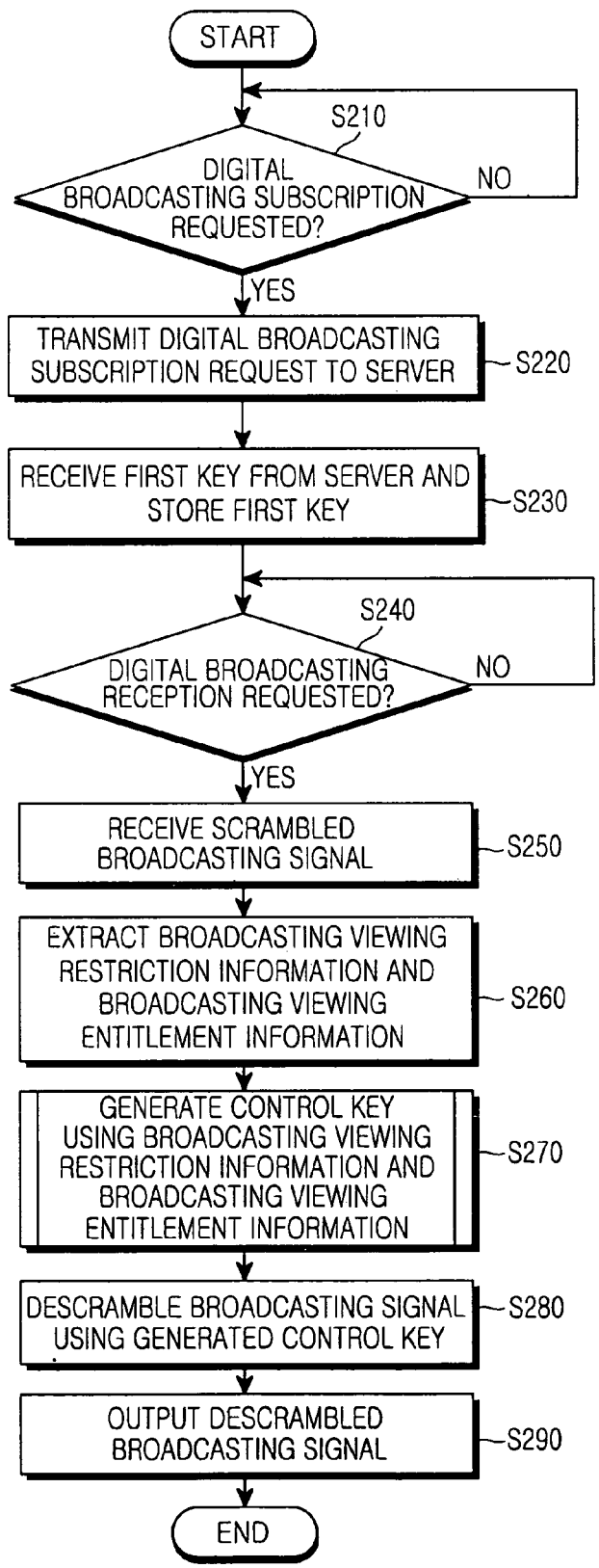
FIG. 6 is a flowchart illustrating an operation of a digital broadcasting receiver according to the present invention.

FIG. 6 is a flowchart illustrating an operation of the digital broadcasting receiver 200 according to the present invention.

The digital broadcasting receiver 200 determines whether a user requests digital broadcasting subscription in step S210. The user's request involves requesting a first key allowing the digital broadcasting receiver 200 to receive digital broadcasting. The digital broadcasting receiver 200 can decrypt broadcasting viewing entitlement information included in a broadcasting signal broadcast by the digital broadcasting transmitter 100 using the first key.

The digital broadcasting receiver 200 transmits the user's digital broadcasting subscription request to a separate server (e.g., a subscriber management server) in step S220. At this time, the digital broadcasting receiver 200 transmits subscriber information to the server using an SMS message or the wireless Internet. The subscriber information may include user information and information about the smart card 265 included in the digital broadcasting receiver 200.

If the server transmits the first key after authorization of the digital broadcasting subscription request, the digital broadcasting receiver 200 receives and stores the first key in step S230.

The digital broadcasting receiver 200 determines whether the user requests digital broadcasting reception in step S240. The user may request digital broadcasting reception by inputting a hot key preset for digital broadcasting reception or using a menu. The hot key may be one of the keys included in the digital broadcasting receiver 200 or may be separately provided.

If the user requests digital broadcasting reception, the digital broadcasting receiver 200 switches an operation mode into a digital broadcasting reception mode and receives a scrambled broadcasting signal in step S250.

The digital broadcasting receiver 200 extracts broadcasting viewing restriction information and broadcasting viewing entitlement information included in the received broadcasting signal in step S260. At this time, the digital broadcasting receiver 200 extracts only broadcasting viewing restriction information and broadcasting viewing entitlement information corresponding to subscriber information (i.e., subscriber information of the digital broadcasting receiver 200).

The digital broadcasting receiver 200 generates a control key using the extracted broadcasting viewing restriction information and broadcasting viewing entitlement information in step S270. Generation of the control key in steps S270 will be described in more detail with reference to FIG. 7.

The digital broadcasting receiver 200 descrambles the scrambled broadcasting signal using the generated control key in step S280, and outputs the descrambled broadcasting signal in step S290.

Figure 7:
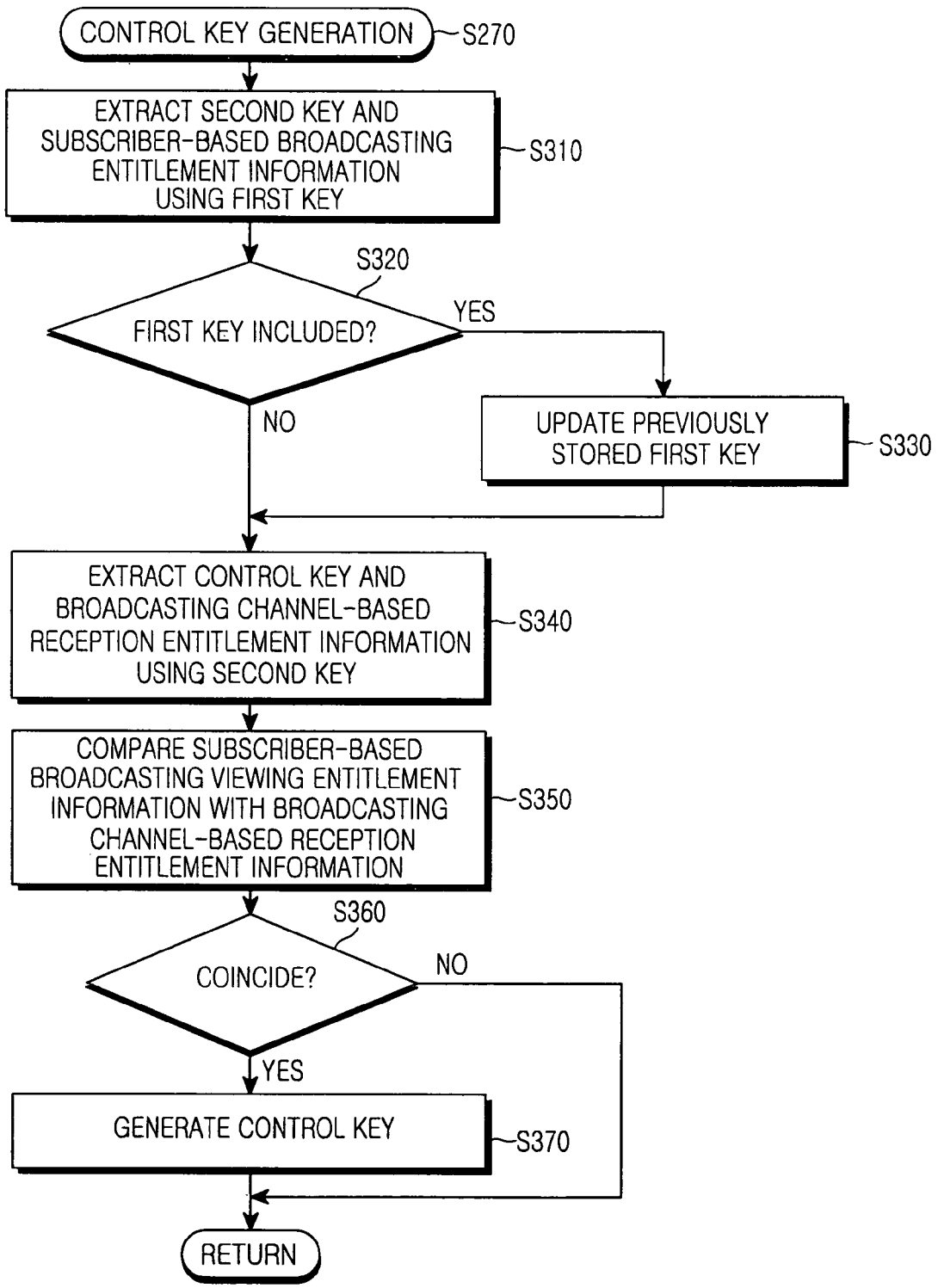
FIG. 7 is a flowchart illustrating the generation of a control key in the operation of FIG. 6.

FIG. 7 is a flowchart illustrating generation of the control key in the operation S270 of FIG. 6.

Referring to FIGS. 6 and 7, after extracting broadcasting viewing restriction information and broadcasting viewing entitlement information included in the received broadcasting signal in step S260 of FIG. 6, the digital broadcasting receiver 200 extracts a second key and subscriber-based broadcasting viewing entitlement information included in the broadcasting viewing entitlement information using a previously stored first key in step S310. The first key is used to decrypt the broadcasting viewing entitlement information and the second key is used to decrypt the broadcasting viewing restriction information.

The digital broadcasting receiver 200 determines whether the first key is included in the broadcasting viewing entitlement information when decrypting the broadcasting viewing entitlement information to extract the second key and the subscriber-based broadcasting viewing entitlement information in step S320.

If the first key is included in the broadcasting viewing entitlement information, the digital broadcasting receiver 200 updates the previously stored first key in step S330.

If the first key is not included in the broadcasting viewing restriction information, the digital broadcasting receiver 200 extracts the control key and broadcasting channel-based reception entitlement information included in the broadcasting viewing restriction information using the extracted second key in step S340.

The digital broadcasting receiver 200 compares the extracted subscriber-based broadcasting viewing entitlement information with broadcasting channel-based reception entitlement information in step S350 to determine whether they coincide with each other in step S360.

If the extracted subscriber-based broadcasting viewing entitlement information and broadcasting channel-based reception entitlement information coincide with each other (i.e., if a corresponding subscriber is an authorized subscriber), the digital broadcasting receiver 200 generates the control key in step S370 and returns to the process.

As described above, a digital broadcasting conditional access system and method can be provided for a digital broadcasting receiver including a smart card.

Moreover, according to the present invention, a digital broadcasting receiver can easily make a conditional access to digital broadcasting using an SMS message and a smart card.

While the present invention has been shown and described with reference to preferred embodiments thereof, it will be understood by those skilled in the art that various changes in form and details may be made therein without departing from the spirit and scope of the invention.

What is claimed is:

1. A broadcasting signal transmission method of a digital broadcasting transmitter, the broadcasting signal transmission method comprising the steps of:
  scrambling a broadcasting signal using a control key;
  generating broadcasting viewing restriction information and broadcasting viewing entitlement information for the broadcasting signal;
  incorporating the broadcasting viewing restriction information and the broadcasting viewing entitlement information into the scrambled broadcasting signal; and
  transmitting the scrambled broadcasting signal, which is incorporated with the broadcasting viewing restriction information and the broadcasting viewing entitlement information,
  wherein the broadcasting viewing entitlement information transmitted at every predetermined period comprises an updated first key for decrypting subsequent broadcasting viewing entitlement information.

2. The broadcasting signal transmission method of claim 1, wherein the broadcasting viewing restriction information is an Entitlement Control Message (ECM) including broadcasting channel-based reception entitlement information and the control key.

3. The broadcasting signal transmission method of claim 1, wherein the broadcasting viewing entitlement information is an Entitlement Management Message (EMM) including a second key for decrypting the broadcasting viewing restriction information and subscriber-based broadcasting viewing entitlement information.

4. A broadcasting signal reception method of a digital broadcasting receiver, the broadcasting signal reception method comprising the step of:
- receiving a scrambled broadcasting signal;
- extracting broadcasting viewing entitlement information and broadcasting restriction entitlement information incorporated into the scrambled broadcasting signal;
- decrypting the broadcasting viewing entitlement information using a first key;
- extracting a control key by decrypting the broadcasting viewing restriction information using the decrypted broadcasting viewing entitlement information;
- descrambling the scrambled broadcasting signal using the control key; and
- updating the first key if an updated first key is included in the broadcasting viewing entitlement information.

5. The broadcasting signal reception method of claim 4, wherein the broadcasting viewing restriction information is an Entitlement Control Message (ECM) including broadcasting channel-based reception entitlement information and the control key.

6. The broadcasting signal reception method of claim 4, wherein the broadcasting viewing entitlement information is an Entitlement Management Message (EMM) including a second key for decrypting the broadcasting viewing restriction information and subscriber-based broadcasting viewing entitlement information.

7. The broadcasting signal reception method of claim 4, further comprising:
- transmitting a broadcasting subscription request to a server;
- receiving the first key from the server in response to the broadcasting subscription request; and
- storing the received first key.

8. The broadcasting signal reception method of claim 4, wherein extracting the control key comprises:
- extracting a second key and subscriber-based broadcasting viewing entitlement information included in the broadcasting viewing entitlement information using the first key;
- extracting the control key and broadcasting channel-based reception entitlement information included in the broadcasting viewing restriction information using the extracted second key.

9. The broadcasting signal reception method of claim 8, further comprising:
- determining whether the extracted subscriber-based broadcasting viewing entitlement information and broadcasting channel-based reception entitlement information coincide with each other; and
- generating the control key if the extracted subscriber-based broadcasting viewing entitlement information and broadcasting channel-based reception entitlement information coincide with each other.

10. A digital broadcasting transmitter comprising:
- a scrambler for scrambling a broadcasting signal using a control key;
- a broadcasting viewing restriction information generator for generating broadcasting viewing restriction information;
- a broadcasting viewing entitlement information generator for generating broadcasting entitlement restriction information; and
- a multiplexer for multiplexing the broadcasting viewing restriction information and broadcasting entitlement restriction information with the broadcasting signal scrambled by the scrambler,
- wherein the broadcasting viewing entitlement information transmitted at every predetermined period comprises an updated first key for decrypting subsequent broadcasting viewing entitlement information.

11. The digital broadcasting transmitter of claim 10, wherein the broadcasting viewing restriction information is an Entitlement Control Message (ECM) including broadcasting channel-based reception entitlement information and the control key.

12. The digital broadcasting transmitter of claim 10, wherein the broadcasting viewing entitlement information is an Entitlement Management Message (EMM) including a second key for decrypting the broadcasting viewing restriction information and subscriber-based broadcasting viewing entitlement information.

13. A digital broadcasting receiver comprising:
- a digital broadcasting receiving unit for receiving a scrambled broadcasting signal;
- a filter for extracting broadcasting viewing restriction information and broadcasting viewing entitlement information from the scrambled broadcasting signal;
- a storing unit for storing a first key;
- a control key generator for decrypting the broadcasting viewing entitlement information using the first key, and extracting a control key by decrypting the broadcasting viewing restriction information using the decrypted broadcasting viewing entitlement information; and
- a descrambler for descrambling the scrambled broadcasting signal using the control key,
- wherein the control key generator updates the first key if an updated first key is included in the broadcasting viewing entitlement information.

14. The digital broadcasting receiver of claim 13, wherein the broadcasting viewing restriction information is an Entitlement Control Message (ECM) including broadcasting channel-based reception entitlement information and the control key.

15. The digital broadcasting receiver of claim 13, wherein the broadcasting viewing entitlement information is an Entitlement Management Message (EMM) including a second key for decrypting the broadcasting viewing restriction information and subscriber-based broadcasting viewing entitlement information.

16. The digital broadcasting receiver of claim 13, wherein the control key generator extracts a second key and subscriber-based broadcasting viewing entitlement information included in the broadcasting viewing entitlement information using the first key and extracts the control key and broadcasting channel-based reception entitlement information included in the broadcasting viewing restriction information using the extracted second key.

17. The digital broadcasting receiver of claim 16, wherein the control key generator compares the extracted subscriber-based broadcasting viewing entitlement information with broadcasting channel-based reception entitlement information and transmits the control key to the descrambler if the extracted subscriber-based broadcasting viewing entitlement information and broadcasting channel-based reception entitlement information coincide with each other.

18. The digital broadcasting receiver of claim 13, wherein the storing unit is a memory or a Subscriber Identity Module (SIM) card.

* * * * *